Feb. 4, 1941.    J. A. CAMERON    2,230,882
DAMPER
Filed Dec. 19, 1938

Inventor:
John A. Cameron
By McCanna, Wintercorn & Norebach
Attys.

Patented Feb. 4, 1941

2,230,882

UNITED STATES PATENT OFFICE 2,230,882

DAMPER

John A. Cameron, Dubuque, Iowa, assignor to The Adams Company, Dubuque, Iowa, a corporation of Iowa Application December 19, 1938, Serial No. 246,631

1 Claim. (Cl. 126—295)

This invention relates to dampers, and has special reference to dampers of the type used to control the passage of air in forced air circulating systems.

An important object of the invention is the provision of a damper of simple design which is easily assembled in the pipe, can be rapidly and easily locked in fixed position, and when so locked, the parts are all rigidly supported to prevent audible vibration of the damper, as a result of pulsations in the air stream, which can be rapidly released for adjustment of the damper position, and which provides positive indication of the damper position.

Other objects and advantages will appear from the following description and the accompanying drawing, in which—

Figure 3:
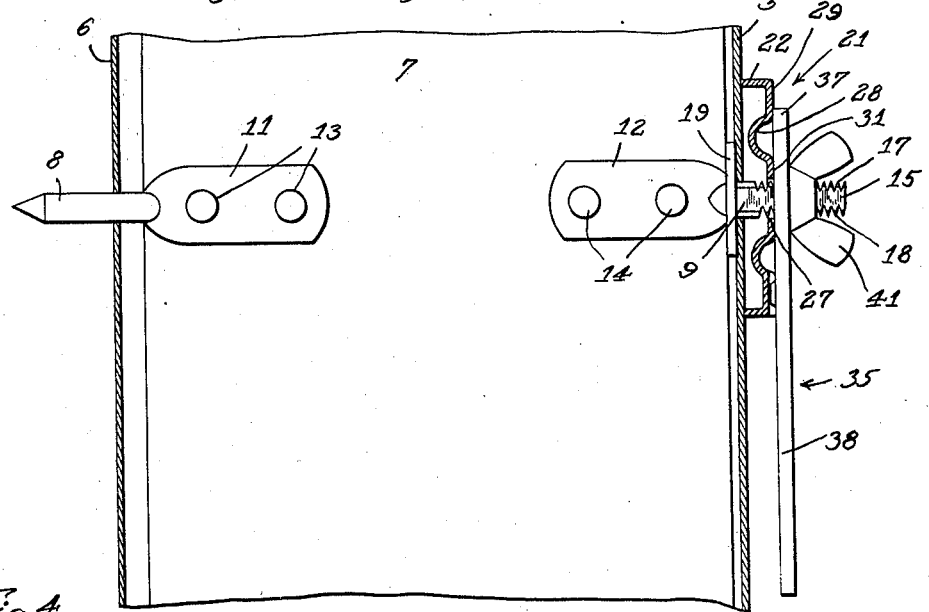
Fig. 3 is a fragmentary section through a pipe showing the damper construction taken substantially on the line 3—3 of Figure 1.

The invention is herein shown as embodied in an air circulating pipe of rectangular cross-section, the opposed side walls thereof being shown at 5 and 6. Positioned within the pipe is a damper vane designated generally by the numeral 7, which consists of a rectangular piece of sheet metal of such size as to fit within the pipe and to very largely obstruct circulation through the pipe when positioned in a plane transverse to the length of the pipe. Attached to the damper vane 7 are trunnions 8 and 9 which pass through openings in the pipe walls 5 and 6 and serve to support the vane for rotation about its center within the pipe. In this instance the trunnions 8 and 9 consist of rods flattened at their ends as shown at 11 and 12 and attached to the vane by means of rivets 13 and 14. The trunnion 9 also serves as a part of the damper actuating or regulating mechanism, and for this purpose has opposed sides flattened as shown at 15 and 16, the arcuate intermediate sides 17 and 18 being threaded, as shown in Fig. 3. The trunnion 9 has a washer 19 positioned thereon intermediate the damper vane 7 and the inner side of the pipe 5 so as to form in effect a flange on the trunnion to provide abutment and bearing surfaces between the vane and the inner side of the pipe surface 5, as will appear from Fig. 3.

Figure 1:
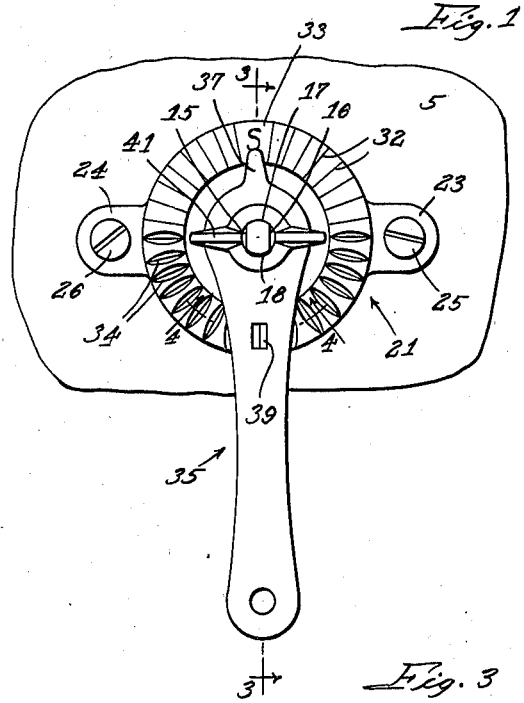
Figure 1 is a side view of a pipe to which a damper embodying the invention has been applied.
Figure 2:
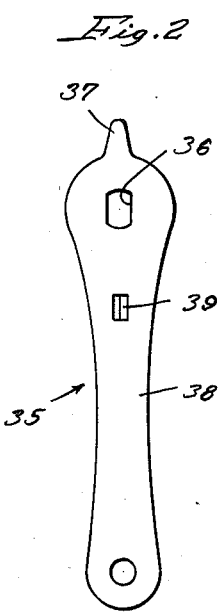
Fig. 2 is a bottom view of the damper handle.
Figure 4:
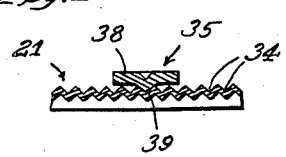
Fig. 4 is a section on the line 4—4 of Figure 1.

Positioned against the outer surface of the side 5 of the pipe is a dial designated generally by the numeral 21, this dial having an annular flange 22 adapted to seat against the outer side of the pipe and provided with laterally extending ears 23 and 24 secured to the side 5 of the pipe by means of screws 25 and 26. The dial also has a centrally disposed opening 27 and a circular depression 28 intermediate the central opening and the edge of the dial to provide an upraised rim 29 and a central portion 31 around the opening 27. The rim 29 is provided with a plurality of score marks 32 on its outer face spaced annularly of the rim through substantially 180° as best shown in Figure 1, the space between two of these indicia bearing a letter, as shown at 33, to indicate the closed or open position of the damper vane, and thus serving as a reference point for the setting of the damper. Through the other 180° of the rim 29 there is provided a plurality of spaced notches 34 extending radially of the dial, as best shown in Figs. 1 and 4.

Cooperating with the dial 21 is a handle designated generally by the numeral 35 having an opening 36 adjacent one end complementary in shape to the outer end of the trunnion 9, that is, having spaced flat edges and intermediate curved edges so as to slide onto the trunnion and be movable longitudinally of the axis of the trunnion. The handle has a finger 37 extending outwardly from the end nearest the opening 36 adapted to serve as a pointer and to cooperate with the score lines 32 on the rim to indicate the position of the damper vane. The handle is of such length as to extend outward radially a substantial distance beyond the dial and thus provide a portion 38 to be grasped by the operator in rotating the handle and the damper vane. The portion 38 of the handle has a projection 39 spaced from the opening 36 a distance such as to be cooperable with the notches 34 of the rim in the manner shown in Fig. 4, in this instance the metal of the handle merely being struck out or depressed to provide this projection. A wing nut 41 or other nut is threaded onto the trunnion 9 engaging the threaded portions 17 and 18 and serves to press the handle against the dial and at the same time draw the damper against the washer 19, and the washer 19 against the inner side of the pipe wall 5, thus drawing all of the parts rigidly together so as to prevent vibration under the influence of pulsations in the air stream acting on the pipe and on the damper vane 7.

It will be seen that when the nut 41 is backed away from the lever slightly, the lever may be rotated so as to rotate the trunnions 8 and 9 and swing the vane 7 to the desired point, the position of the vane being indicated by the position of the pointer 37 against the rim indicia 32 and 33, the backing off of the nut loosening not only the lever but the trunnion and the vane itself so that all are free to move. On the other hand, when the nut is tightened, the projection 39 seats into the notches 34 in the manner shown in Fig. 4 so as to effectively prevent accidental rotation of the handle 35 or rotation of the vane or handle under the pulsations in the air passing through the pipe. It will be seen that when thus tightened the finger 37 bears against the rim 29 and the lever also bears against the rim at the notch 39, thus giving support on opposite sides of the handle. Furthermore, the handle bears against the dial in the area around the opening 27. In addition to this, a certain amount of resiliency is imparted to the assembly by the fact that the central portion of the dial is spaced from the side 5 of the pipe, and by the fact that the parts are drawn against the inside of the side 5 on the one hand, and against the outer surface of the dial on the other hand. In some instances the wing nut 41 may be replaced by a conventional square or hexagonal nut so that a wrench is required to loosen the parts, thereby preventing tampering with the device by children or casual bystanders, this being rendered possible by the locking action which occurs between the projection 39 and the notches 34.

While I have described and illustrated a specific embodiment of the invention by way of illustration I do not wish to be limited except as required by the prior art and the scope of the appended claim, in which I claim:

The combination in a damper regulator for forced air circulating pipes of the type having a rotatable damper member, of trunnion members arranged for attachment to opposite edges of the damper member and extending through the pipe to support the damper member, a shoulder on one of said trunnions adapted to bear against the inner surface of the pipe, a dial arranged for attachment to the outer surface of the pipe, said dial having a central opening for the passage of said last mentioned trunnion, a central raised portion, an annular raised portion, an intermediate depressed portion in spaced relation to the side of the pipe, and a peripheral flange adapted to bear against the outer surface of the pipe to provide resiliency in the inner portions of the dial, a handle having an opening spaced from one end for the reception of said last mentioned trunnion, said handle being positioned between said dial and the end of said trunnion, the trunnion and the handle having shape characteristics for longitudinal movement of the handle on the trunnion and for turning the trunnion by means of the handle, and a nut on said trunnion for moving the handle longitudinally thereon to draw the handle against the dial and the shoulder against the pipe to thereby secure the parts in position, said annular portion of the dial having a portion provided with a plurality of recesses and a diametrically opposed smooth surfaced portion and said handle having a projection on one side of said trunnion for engagement with said recesses, and means on the opposite side of the trunnion overlying a part of said smooth surfaced portion to serve as a fulcrum against said smooth surfaced portion upon lateral movement of the handle to lift said projections from said recesses upon springing of the smooth surfaced portion of the dial, and to serve as a resilient way for support of the handle during the rotation thereof.

JOHN A. CAMERON.